(12) United States Patent
Cho (10) Patent No.: US 11,904,836 B2
(45) Date of Patent: Feb. 20, 2024

(54) ECO-FRIENDLY VEHICLE AND METHOD OF SUPPORTING AUDIO INPUT/OUTPUT FOR THE SAME

(71) Applicants: Hyundai Motor Company, Seoul (KR); Kia Corporation, Seoul (KR)

(72) Inventor: Jin Kyeom Cho, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/861,662

(22) Filed: Jul. 11, 2022

(65) Prior Publication Data

US 2023/0211770 A1 Jul. 6, 2023

(30) Foreign Application Priority Data

Dec. 31, 2021 (KR) ........................ 10-2021-0194666

(51) Int. Cl.
*B60W 20/17* (2016.01)
*B60W 10/06* (2006.01)
(Continued)

(52) U.S. Cl.
CPC ............ *B60W 20/17* (2016.01); *B60W 10/06* (2013.01); *B60W 10/08* (2013.01); *B60W 10/10* (2013.01); *B60W 2540/21* (2020.02); *B60W 2710/0644* (2013.01); *B60W 2710/0666* (2013.01); *B60W 2710/081* (2013.01); *B60W 2710/083* (2013.01); *B60W 2710/1005* (2013.01)

(58) Field of Classification Search
CPC ...... B60W 20/17; B60W 20/30; B60W 10/06; B60W 10/10; B60W 10/08; B60W 2540/21; B60W 2710/0644; B60W 2710/0666; B60W 2710/081; B60W 2710/083; B60W 2710/1005; B60Y 2306/09
See application file for complete search history.

(56) References Cited

U.S. PATENT DOCUMENTS 6,031,918 A * 2/2000 Chahabadi ............... H04R 3/12
  381/86
6,907,325 B1 * 6/2005 Syed ...................... B60W 20/11
  701/22

(Continued)

FOREIGN PATENT DOCUMENTS

KR 10-2018-0119929 A 11/2018
KR 10-2019-0088737 A 7/2019
KR 10-2020-0033617 A 3/2020

*Primary Examiner* — Timothy Hannon
(74) *Attorney, Agent, or Firm* — Fox Rothschild LLP (57) ABSTRACT

The present disclosure relates to an eco-friendly vehicle in which powertrain noise may be controlled such that voice command recognition of the vehicle control system may be improved and also audio guidance therefrom may be better recognized by a driver, and a method for supporting audio input/output for the same. A method of supporting audio input/output for an eco-friendly vehicle according to an embodiment of the present disclosure includes determining whether a first condition for audio input/output function and a second condition for inside noise level are satisfied; and performing a noise reduction control by changing an operating point of a driving power source based on a current drive mode, in case where the first and the second conditions are satisfied.

19 Claims, 9 Drawing Sheets

(51) Int. Cl.
*B60W 10/10* (2012.01)
*B60W 10/08* (2006.01)

(56) References Cited

U.S. PATENT DOCUMENTS

| | | | | |
|---|---|---|---|---|
| 8,384,528 | B2* | 2/2013 | McCarthy | H04S 7/00 |
| | | | | 381/71.4 |
| 10,486,689 | B2* | 11/2019 | Farrell | B60W 30/182 |
| 2020/0098355 | A1* | 3/2020 | Lee | G10L 15/00 |
| 2020/0231138 | A1* | 7/2020 | Burkholz | B60W 10/30 |

* cited by examiner

ECO-FRIENDLY VEHICLE AND METHOD OF SUPPORTING AUDIO INPUT/OUTPUT FOR THE SAME

This application claims under 35 U.S.C. § 119(a) the benefit of Korean Patent Application No. 10-2021-0194666, filed on Dec. 31, 2021, which is hereby incorporated by reference as if fully set forth herein.

BACKGROUND OF THE DISCLOSURE

Field of the Disclosure

The present disclosure relates to an eco-friendly vehicle in which powertrain noise may be controlled such that voice command recognition of the vehicle control system may be improved and also audio guidance therefrom may be better recognized by a driver, and a method for supporting audio input/output for the same.

Discussion of the Related Art

Recently, voice input/output function may be actively applied to a vehicle. For example, a driver may set a destination by voice for a navigation system, and turn-by-turn guides for path guiding may be output by voice. However, while driving, powertrain noise keeps occurring, and also tire and surrounding noise comes inside. Accordingly, due to the noise, the rate of recognition of a driver's voice command may be reduced, and also the driver may have difficulties in recognizing guiding voice from the vehicle system. In particular, generally, inputting commands by voice may be better at reducing distractions during driving than by physical manipulations, however, if the recognition rate of the system is reduced, it may actually increase distracts by making the driver repeatedly input the voice commands and check the results.

On the other hand, with rising interest in environment, the number of eco-friendly vehicles having a motor as a driving power source is increasing. An eco-friendly vehicle may also be called an electrified vehicle, typical examples of which may be Electric Vehicle (EV) and Hybrid Electric Vehicle (HEV). In a hybrid electric vehicle, while the engine may be operating, the engine noise comes inside, and even though only a motor may be operating, it may only be relatively silent compared to when the engine operating and not free from noise problems. Accordingly, in an eco-friendly vehicle too, the powertrain may serve as a hindering factor for the voice input/output.

SUMMARY OF THE DISCLOSURE

An object of the present disclosure may be to provide an eco-friendly vehicle able to effectively control its noise when a voice-input/output related function may be used, and a method for supporting audio input/output for the same.

Additional objects of the disclosure will be set forth in part in the description which follows and in part will become apparent to those having ordinary skill in the art upon examination of the following or may be learned from practice of the disclosure. The objects of the disclosure may be realized and attained by the structure particularly pointed out in the written description and claims hereof as well as the appended drawings.

A method of supporting audio input/output for an eco-friendly vehicle according to an embodiment of the present disclosure includes determining whether a first condition for audio input/output function and a second condition for inside noise level may be satisfied; and performing a noise reduction control by changing an operating point of a driving power source based on a current drive mode, in case where the first and the second conditions may be satisfied.

For example, the first condition may be at least one of a start of an audio guidance output and/or a start of a voice command input.

For example, the second condition may be whether the inside noise level may be greater than a predetermined noise level.

For example, the performing of the noise reduction control, in case where the current drive mode may be an EV mode, may include performing a gear shift to a gear position corresponding to an operating point at which noise of a motor may be lower than at a current operating point.

For example, the performing of the noise reduction control may include determining a first operating point of the motor according to an upshift and a second operating point of the motor according to a downshift; and determining a gear position corresponding to the one of the first operating point and second operating point at which the motor noise may be lower than at the other of the second operating point and the first operating point.

For example, the determining of the gear position may be performed with reference to a noise map for torque and RPM of the motor.

For example, in case where the current drive mode may be a HEV mode, the performing of the noise reduction control may include changing a current operating point of an engine to a new operating point at which a noise level of the engine may be lower; and compensating for a torque change of the engine according to the new operating point by a change of an operating point of the motor.

For example, the changing may be performed with reference to a noise map for torque and RPM of the engine.

For example, the performing of the noise reduction control may include restricting a variation rate of an output torque of the driving power source.

A computer readable recording medium according to an embodiment of the present disclosure has a program for executing at least one of the methods described herein recorded therein that may be executed by a processor and perform the functions of the method as described herein.

An eco-friendly vehicle according to an embodiment of the present disclosure may include a driving power source; and a control unit configured to determine whether a first condition for audio input/output function and a second condition for inside noise level may be satisfied, and perform a noise reduction control by changing an operating point of a driving power source based on a current drive mode, in case where the first and the second conditions may be satisfied.

For example, the first condition may be at least one of a start of audio guidance output and a start of voice command input.

For example, the second condition may be whether the inside noise level may be greater than a predetermined noise level.

For example, the control unit may be configured, in case where the current drive mode may be EV mode, to perform a gear shift to a gear position corresponding to an operating point at which noise of a motor may be lower than at a current operating point.

For example, the control unit may be configured to determine a first operating point of the motor according to an upshift and a second operating point of the motor according to a downshift, and determine a gear position corresponding to the one of the first and second operating points at which the motor noise may be lower than at the other.

For example, the control unit may be configured to determine the gear position with reference to a noise map for torque and RPM of the motor.

For example, the control unit, in case where the current drive mode may be a HEV mode, may be configured to change a current operating point of an engine to a new operating point at which a noise level of the engine may be lower, and compensate for a torque change of the engine according to the new operating point by a change of an operating point of the motor.

For example, the control unit may be configured to change the operating point with reference to a noise map for torque and RPM of the engine.

For example, the control unit may be configured to restrict a variation rate of an output torque of the driving power source.

According to various embodiment of the present disclosure like described above, when an audio input/output function used in an eco-friendly vehicle, recognition rate of voice command may be improved and a driver may be helped to better recognize guiding voice from the vehicle system, by controlling the powertrain to reduce the vehicle noise.

Additional advantages, and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements may be assigned and used interchangeably in consideration of convenience of explanation, and thus, the terms per se do not necessarily have different meanings or functions. Further, in describing the embodiments disclosed in the present specification, when it may be determined that a detailed description of related publicly known technology may obscure the gist of the embodiments disclosed in the present specification, the detailed description thereof will be omitted. The accompanying drawings may be used to help easily explain various technical features and it should be understood that the embodiments presented herein may not be limited by the accompanying drawings. As such, the present disclosure should be construed to extend to any alterations, equivalents and substitutes in addition to those which may be particularly set out in the accompanying drawings.

Although terms including ordinal numbers, such as "first", "second", etc., may be used herein to describe various elements, the elements may not be limited by these terms. These terms may be generally used to distinguish one element from another.

When an element may be referred to as being "coupled" or "connected" to another element, the element may be directly coupled or connected to the other element. However, it should be understood that another element may be present therebetween. In contrast, when an element may be referred to as being "directly coupled" or "directly connected" to another element, it should be understood that there may be no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification may be present, and does not preclude the possibility of addition or presence of one or more other features, numbers, steps, operations, elements, parts, or combinations thereof.

Before describing an eco-friendly vehicle and a method of controlling a powertrain for supporting audio input/output for the same according to an embodiment of the present disclosure, a structure and a control scheme of a hybrid electric vehicle, as an example of an eco-friendly vehicle applicable to the embodiments, will be described in advance.

Figure 1:
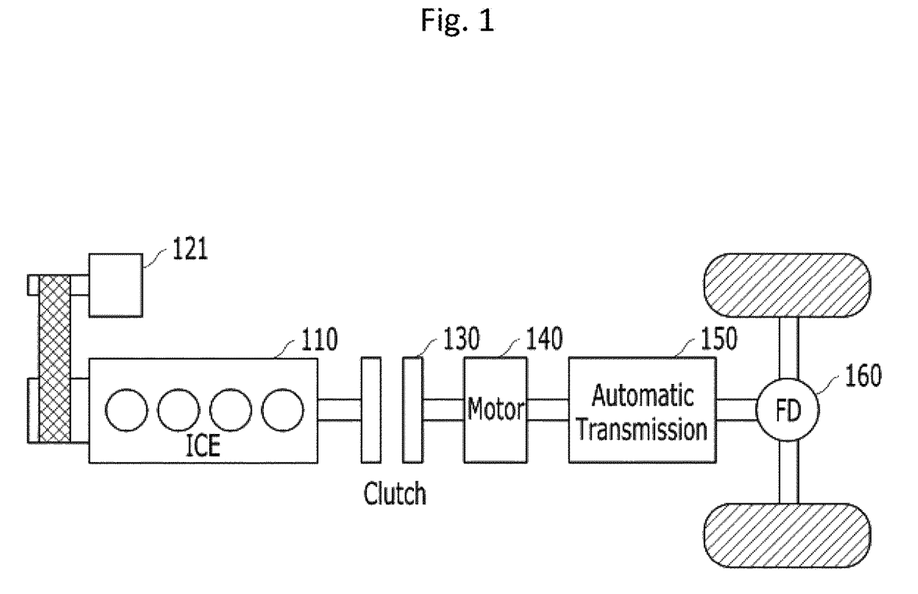
FIG. 1 represents an example of a conceptual structure of the powertrain of a hybrid electric vehicle applicable to embodiments of the present disclosure.

In reference to FIG. 1, a powertrain of a parallel type hybrid electric vehicle comprising an electric (driving) motor 140 and an engine clutch 130 between an internal combustion engine (ICE) 110 and a transmission 150 is shown.

Generally, in this type of vehicle, if a driver stepping on the accelerator pedal (i.e., accelerator pedal sensor being on) after starting the engine, first, the motor 140 may be driven by using battery power with the engine clutch 130 open (disengaged), and thus the wheels may be rotated by the driving power of the motor (140) via the transmission 150 and a final drive (FD) 160 (i.e., the vehicle runs in EV mode). If greater driving power may be needed as the vehicle accelerates, an auxiliary motor (or a starter-generator motor 120) may be operated to drive the engine 110.

Accordingly, when a difference of speed between the engine 110 and the motor 140 comes within a predetermined range, the engine clutch 130 may be engaged and thus the engine 110 and the motor 140 drive the vehicle together (i.e., transition from EV mode to HEV mode). If a predetermined condition for turning off the engine may be satisfied, the engine clutch 130 may be disengaged and the engine 110 stops (i.e., transition from HEV mode to EV mode). At this moment, a battery may be charged by the motor 140 using driving force of the wheels, which may generate brake energy or regenerative brake. Accordingly, since the starter-generator motor 120 serves as a starter motor when starting the engine and as a generator to regenerate rotational energy of the engine after the engine started or when the engine turned off, it may be referred to as a Hybrid Starter Generator (HSG).

Generally, a multi-speed transmission or a transmission with a multi-plate clutch, e.g., a dual clutch transmission (DCT) may be used for the transmission 150.

Figure 2:
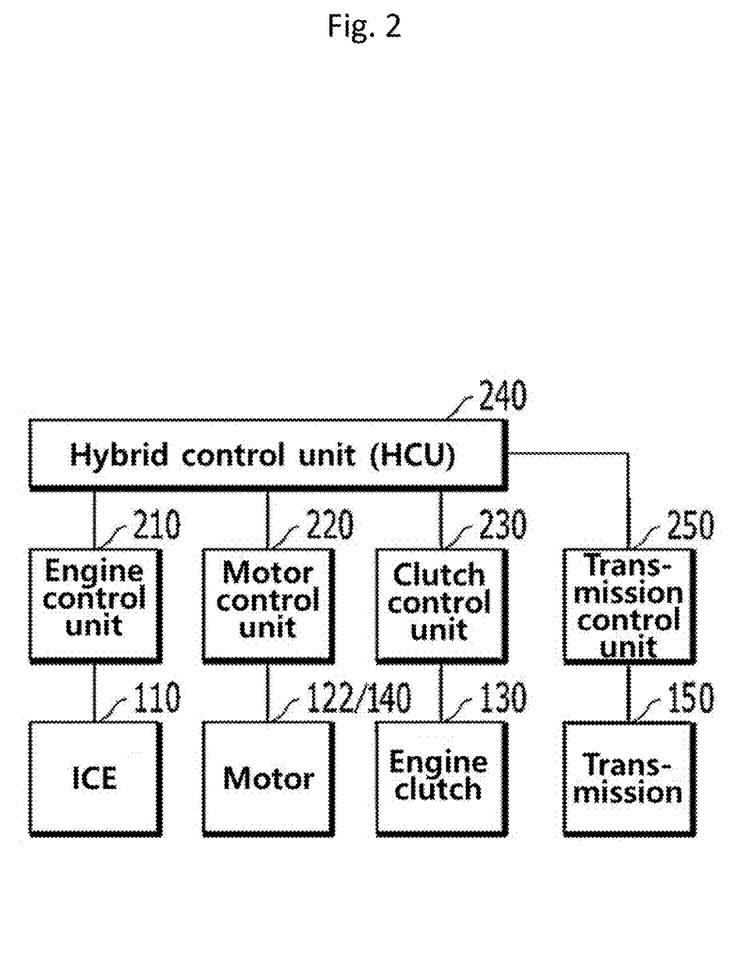
FIG. 2 represents an example of a control scheme for an electrified vehicle according to an embodiment of the present disclosure.

FIG. 2 represents an example of a control scheme for a hybrid electric vehicle according to an embodiment of the present disclosure.

In reference to FIG. 2, in a hybrid electric vehicle to which embodiments of the present disclosure may be applicable, the internal combustion engine 110 may be controlled by an engine control unit 210, the starter-generator motor 120 and the driving motor 140 by a motor control unit (MCU) 220 for their torques, and the engine clutch 130 by a clutch control unit 230, respectively. In here, the engine control unit 210 may also be called an engine management system (EMS). Also, the transmission 150 may be controlled by a transmission control unit 250.

Each control unit may be connected to a hybrid control unit (HCU) 240 which controls overall procedures for mode transitions as an upper control unit thereof, and provide, according to a control thereof, information necessary for the changing of the drive mode and controlling the engine clutch in shifting a gear, and/or information necessary for controlling an engine stop, or perform an action according to a control signal.

For example, the hybrid control unit 240 determines whether to change modes between EV and HEV or CD and CS according to a driving state of the vehicle. To this end, the hybrid control unit may be configured to determine when to disengage the engine clutch 130 and perform fluid control for the disengagement. Also, the hybrid control unit 240 may be configured to determine the state (Lock-up, Slip, Open, etc.) of the engine clutch, and control when to stop injecting fuel into the engine 110. Also, the hybrid control unit may be configured to control regenerating of rotational energy of the engine by transmitting to the motor control unit 220 a torque command for controlling the torque of the starter-generator motor 120 to stop the engine. In addition, when controlling a mode transition of the drive mode, the hybrid control unit 240 may be configured to control the lower control units for a judgment of mode transition conditions and the transition.

Of course, the above described relationship between the control units and the function/distinguishing of each control unit are only examples, and it may be obvious to a person having ordinary skill in the art that they are not also limited to the names. For example, the hybrid control unit 240 may be implemented or replaced by any one of other control units which may be made to further provide the function, or by two or more control units to which the function may be distributed.

The term "unit" or "control unit" included in the names of a hybrid control unit (HCU), a motor control unit (MCU), etc. may be merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto. In addition, each of the described control units describe different functions, but does not necessarily require the separation of the physical units. Therefore each control unit may be integrated into a single unit or separated among multiple control units to provide the described functionality.

FIGS. 1 and 2 are only examples for a hybrid electric vehicle, it may be obvious to a person having ordinary skill in the art that a hybrid electric vehicle applicable to embodiments of the present disclosure may not be limited thereto.

It is suggested, when a voice command is being input or audio guidance is being output in an eco-friendly vehicle according to an embodiment of the present disclosure, to reduce noise occurring from the powertrain by an operating point control so that the recognition rate of the voice may be improved and the audio guidance output from the vehicle system may be well recognized by the driver.

Here, the operating point may mean a torque and a RPM of each of the driving power sources, i.e., the driving motor 140 and the engine 110, which may be currently operating according to the drive mode. For example, in case where the current drive mode may be EV mode, the powertrain noise may be reduced by moving the operating point of the motor to an operating point at which the noise may be relatively low compared to the current operating point. Also, in case where the current drive mode may be HEV mode, by a way of load leveling in order for the driving performance not to be sacrificed, the torque of the engine 110 which causes larger noise than the motor 140 may be reduced at first, and the torque of the motor 140 may be increased by as much as the reduced amount of the engine torque, so that the powertrain noise may be reduced overall. Also, taking it into consideration that a driver's concentration may be distracted while the voice recognition function may be activated, the rate per time unit of a change of the output torque may by limited, so that the driving of the vehicle may be kept stable. Also, while the voice recognition function may be activated, the mode transitions may be restricted. For example, although the current drive mode may be EV mode and a mode transition to HEV mode, in which the engine output may be used for the driving power, may be determined due to an increase of the driver's request torque, the EV mode may be maintained while the voice command may be input or audio guidance may be output. If the current mode may be HEV mode, the mode may be transited to EV mode and maintained. After the mode transition, for additional prevention of noise, not only the mode transition to HEV mode as described above may be inhibited, but also the operation of the engine for the purpose of air conditioning or catalyst heating may not be allowed.

Figure 3:
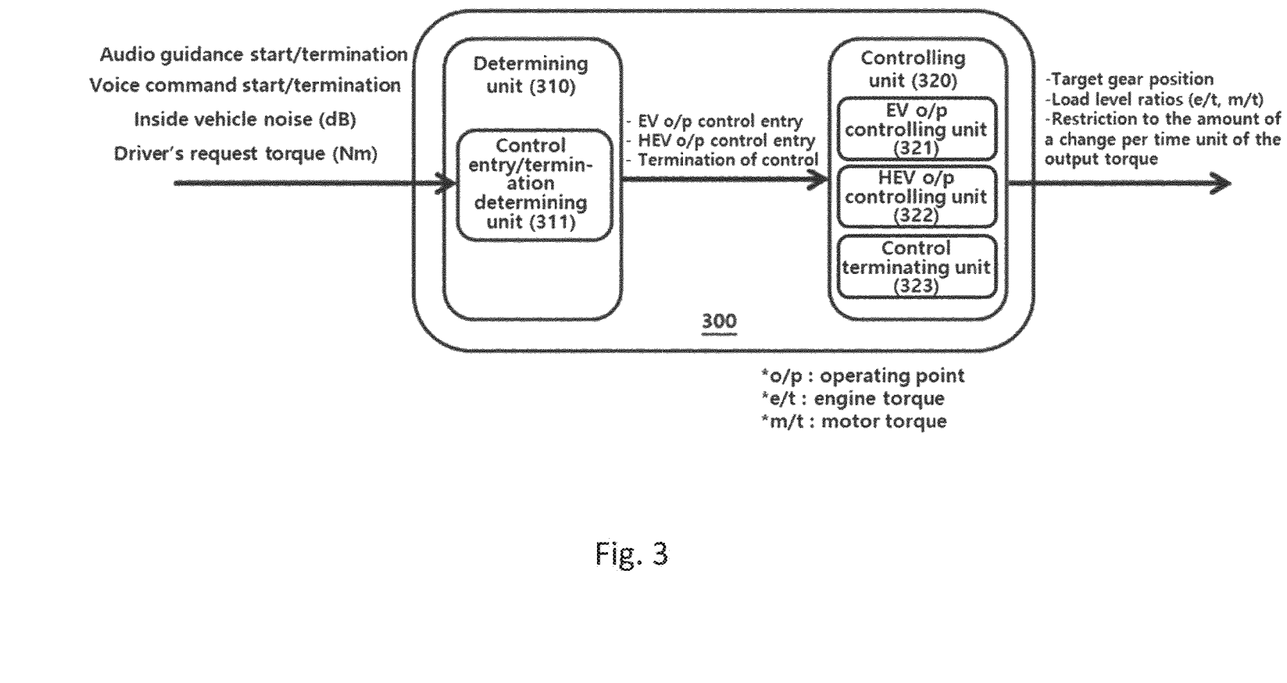
FIG. 3 represents an example of a conceptual structure of an audio input/output supporting control unit according to an embodiment of the present disclosure.

First, in reference to FIG. 3, a conceptual structure of an audio input/output supporting control unit which may perform controlling a powertrain to support effective audio input/output according to an embodiment of the present disclosure is described.

FIG. 3 represents an example of a conceptual structure of an audio input/output supporting control unit according to an embodiment of the present disclosure.

In reference to FIG. 3, the audio input/output supporting control unit 300 according to an embodiment may be configured to receive, as input information, information on a start and a termination of outputting audio guidance, information on a start and a termination of inputting voice command, inside vehicle noise level and a driver's request torque (or request power). Also, the audio input/output supporting control unit 300 may be configured to output a target gear position of the transmission, load level ratios, limits of the amount of a change per time unit of the output torque, etc. as output information.

In here, the audio guidance may include information in a form of voice like voice navigation, but without being limited thereto. Of course, audio guidance, which may be an entry condition for a noise reduction control for a powertrain of an embodiment, may include all types of audio guidance output through a speaker, and otherwise restricted predetermined types of audio guidance (e.g., turn-by-turn voice navigation, alarming sound for speed enforcement cameras, etc.).

Also, the information on a start and a termination of outputting audio guidance may be provided from an AVN (Audio/Video/Navigation) system, but it may not be limited thereto, so that there may be variations according to the source of audio guidance.

The source of the information on a start and a termination of inputting voice commands may be similar to the source of the information on a start and a termination of outputting audio guidance. For example, in case where a voice recognition function of the AVN system may be activated, turned on, according to a driver's manipulation of a voice recognition button on a steering wheel for inputting a voice command, the start of the voice command input may be transmitted to the audio input/output supporting control unit 300. Also, in case where a success or failure of recognizing a voice command may be determined in the AVN system, or the driver terminates the voice recognition function, the AVN system may notify the audio input/output supporting control unit 300 of the termination of the voice command input. Of course, this is only an example and the present disclosure and is not necessarily limited thereto.

The inside vehicle noise information may be provided through a speaker inside the vehicle and by reference to information of a predetermined table prepared according to the current operating point and transmission gear position in the powertrain.

The driver's requested torque may be obtained from an upper control unit controlling the powertrain, e.g., the hybrid control unit 240.

On the other hand, the target gear position as the output information may be transmitted to the transmission control unit 250, and the load level ratios to the engine control unit 210 in the form of an engine torque command and the motor control unit 220 in the form of a motor torque command, respectively. Also, the limits to the amounts of changes per time unit of the output torques may be transmitted to the engine control unit 210 and the motor control unit 220, respectively, and otherwise, not in the form of separate transmission of command/information, the limits may be implemented to be applied to the engine torque command and the motor torque command transmitted to the engine control unit 210 and the motor control unit 220, respectively.

When implemented, since the audio input/output supporting control unit 300 accompany control of the powertrain (e.g., operating point control), it may be efficient that the control unit 300 may be implemented as a function of an upper control unit (vehicle control unit (VCU) in case of electric vehicle) controlling overall the powertrain such as the hybrid control unit 240, but this is only example and the present disclosure that may not be limited thereto.

The audio input/output supporting control unit 300 is detailed below.

The audio input/output supporting control unit 300 may comprise a determining unit 310 and a controlling unit 320, and the determining unit 310 may comprise a control entry/termination determining unit 311 and the controlling unit 320 may comprise an EV operating point controlling unit 321, a HEV operating point controlling unit 322, and a control terminating unit 323.

At first, the control entry/termination determining unit 311 of the determining unit 310 may be configured to determine, based on the above described input information, an entry into and a termination of the noise reduction control of the powertrain to support audio input/output according to an embodiment.

For example, the control entry/termination determining unit 311 may be configured to determine whether a predetermined entry condition to be satisfied or not. For example, the entry condition may be satisfied in case where i) a predetermined type of audio guidance may be started or the voice recognition function may be activated, "on", by a driver, ii) a level of inside vehicle noise may be greater than a predetermined threshold noise level. At the moment, the determining unit 310 may be configured to request an entry into EV operating point control to the controlling unit 320 in case of the current drive mode being EV mode, and an entry into HEV operating point control in case of the current drive mode being HEV mode. In here, the threshold noise level may be predetermined through tests to be a noise level at which voice recognition rate may be below or equal to a specific value, but without being limited thereto. Also, the control entry/termination determining unit 311 may be configured, in case where the current drive mode may be EV mode, to transmit to the controlling unit 210 a request for inhibiting a mode transition along with a request for entering into EV operating point control.

The control entry/termination determining unit 311 may be configured to notify the controlling unit 320 of the termination of the control in case where the above described entry condition may not be satisfied or the audio guidance output or the voice command input may be terminated.

Next, the controlling unit 320 may be detailed.

The EV operating point controlling unit 321 may be configured to perform a control for reducing the overall noise in the EV mode by changing the gear position in the transmission 150 to move the operating point of the motor 140 to the one of a relatively low noise level.

To this end, the EV operating point controlling unit 321 may be configured to judge the current gear position and the changes of the operating point from the current point when the transmission gear being upshifted and downshifted, and determine whether the noise may be reduced for each shifting and an operating point for each shifting to cause lower noise than the current, and then determine the gear position and the operating point which may be directed to make the lower noise. For the judgment, a table of noise by operating point may be used. This will be described in reference to FIGS. 4A to 4C.

Figure 4A:
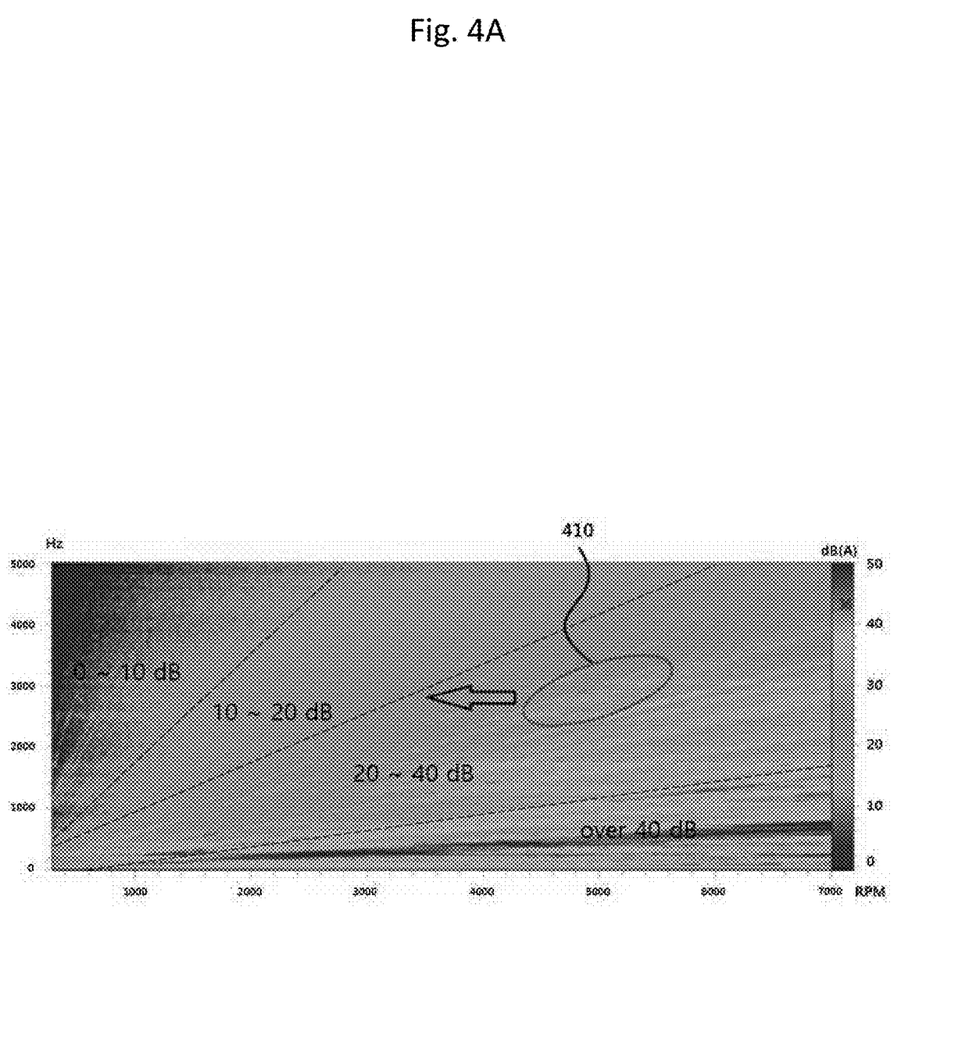
FIGS. 4A to 4C represent an example of operating point control being performed in EV mode according to an embodiment of the present disclosure.
Figure 4B:
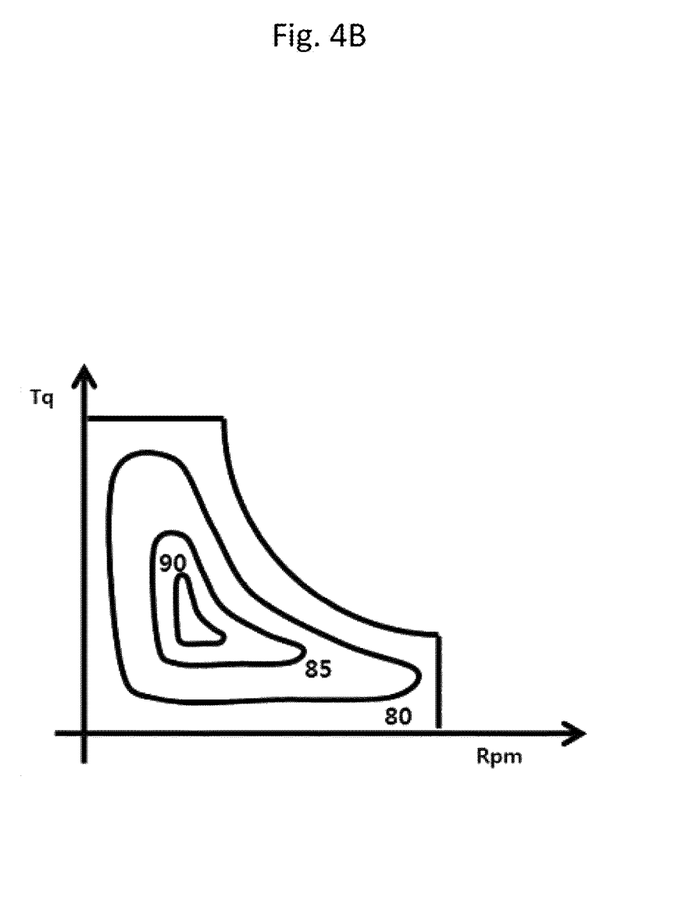
Figure 4C:
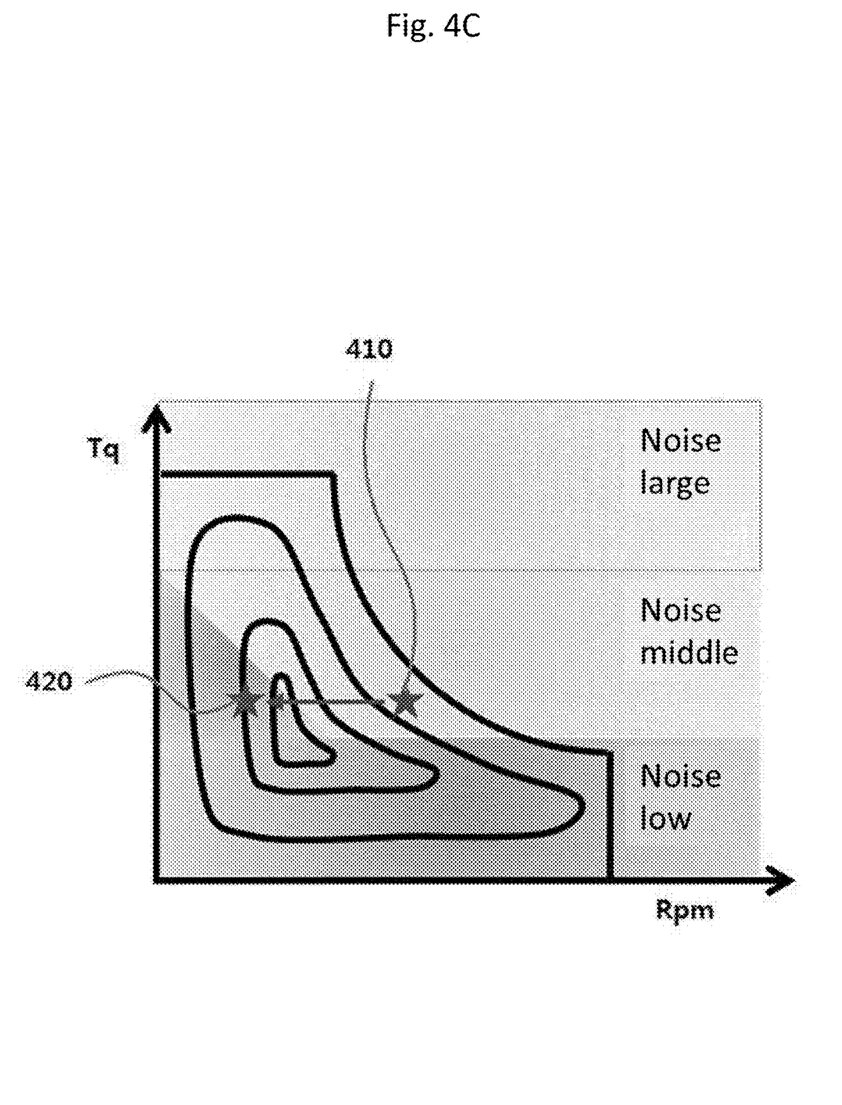

FIGS. 4A to 4C represent an example of operating point control being performed in EV mode according to an embodiment of the present disclosure.

First, in reference to FIG. 4A, a noise distribution of a motor 140 by RPM is shown. As shown, as the RPM may be increased, the frequency range of noise may be enlarged and the noise level may be increased overall. Therefore, if the RPM may be lowered at a certain operating point 410 (i.e., moved in the direction of the arrow), it may be understood that the noise will be reduced.

Next, the horizontal axis indicates the RPM of the motor 140 in the graph of FIG. 4b, and the vertical axis the torque of the motor 140. Also, each curved loop in the graph indicates an equal-efficiency contour which connects the points of the same motor efficiency (%), the efficiency being higher as it going nearer to the center from the outer.

FIG. 4A shows noise levels mainly by RPM, however, if noise levels by RPM may be measured for various torque ranges and combined with an efficiency graph like FIG. 4b, a noise map according to this embodiment may be obtained in the form of 3 divisions of 'low,' 'middle,' and 'large' like FIG. 4C.

This kind of noise map may only be an example, without being limited thereto, and it may be obtained in various forms according to the types of the motor and vehicles through tests, and also the divisions for the degree of the noise may be varied into various levels.

In reference to FIG. 4C, if it is determined that the current operating point 410 is in the "middle" division and can be changed to the operating point 420 in the "low" division by the RPM being reduced due to an upshift from the current gear position, the EV operating point controlling unit 321 may determine the upshift.

Otherwise, the EV operating point controlling unit 321 may, at first, determine a target operating point at which the noise may be reduced compared to the current operating pint, and the gear position corresponding to the determined target operating point.

Also, the EV operating point controlling unit 321 restricts the amount of change per time unit of the output torque to maintain the vehicle in a stable driving state, taking it into consideration that, in case where a change of the operating point due to a gear shift may be accompanied by a variation of the output torque, the driver's concentration may be distracted due to recognition of audio output or voice command input.

Figure 5A:
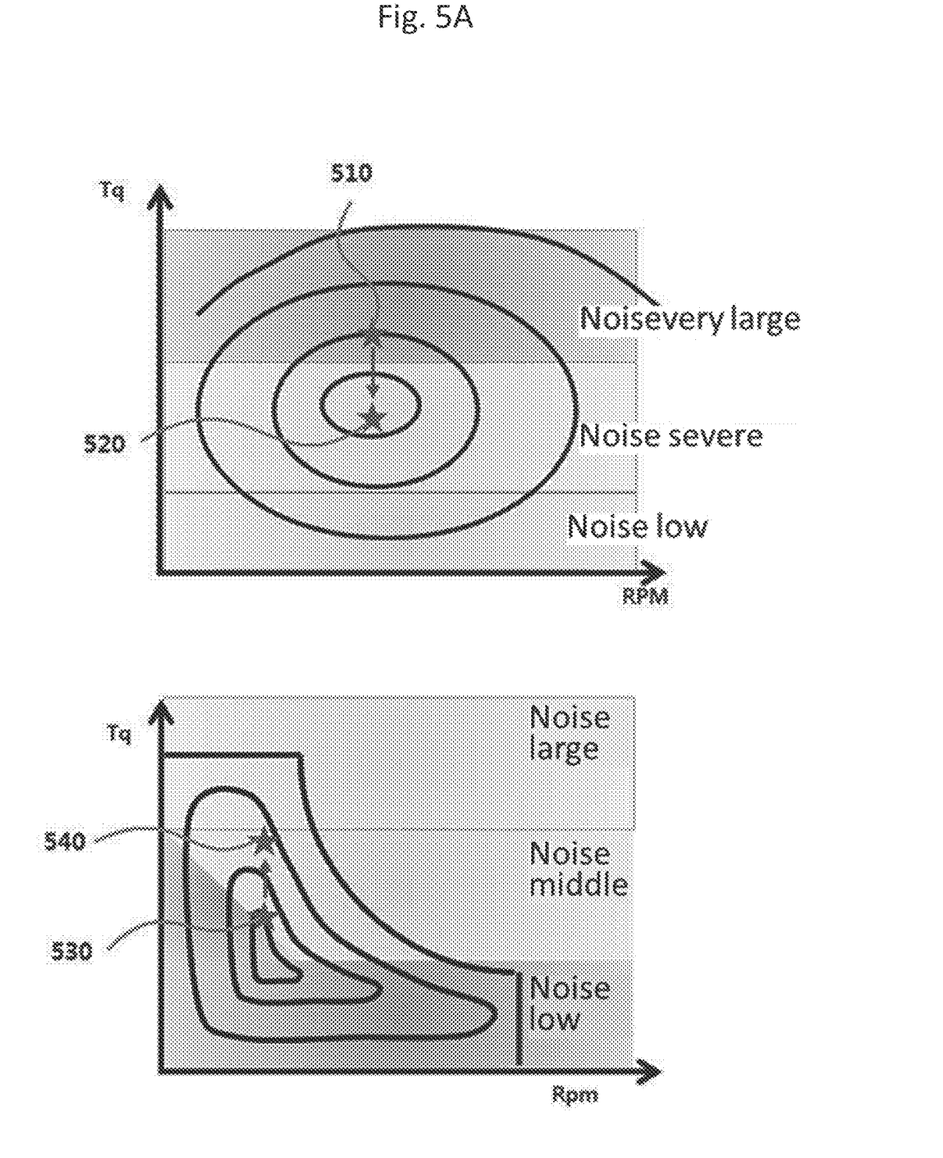
FIGS. 5A and 5B represent an example of operating point control being performed in HEV mode according to an embodiment of the present disclosure.
Figure 5B:
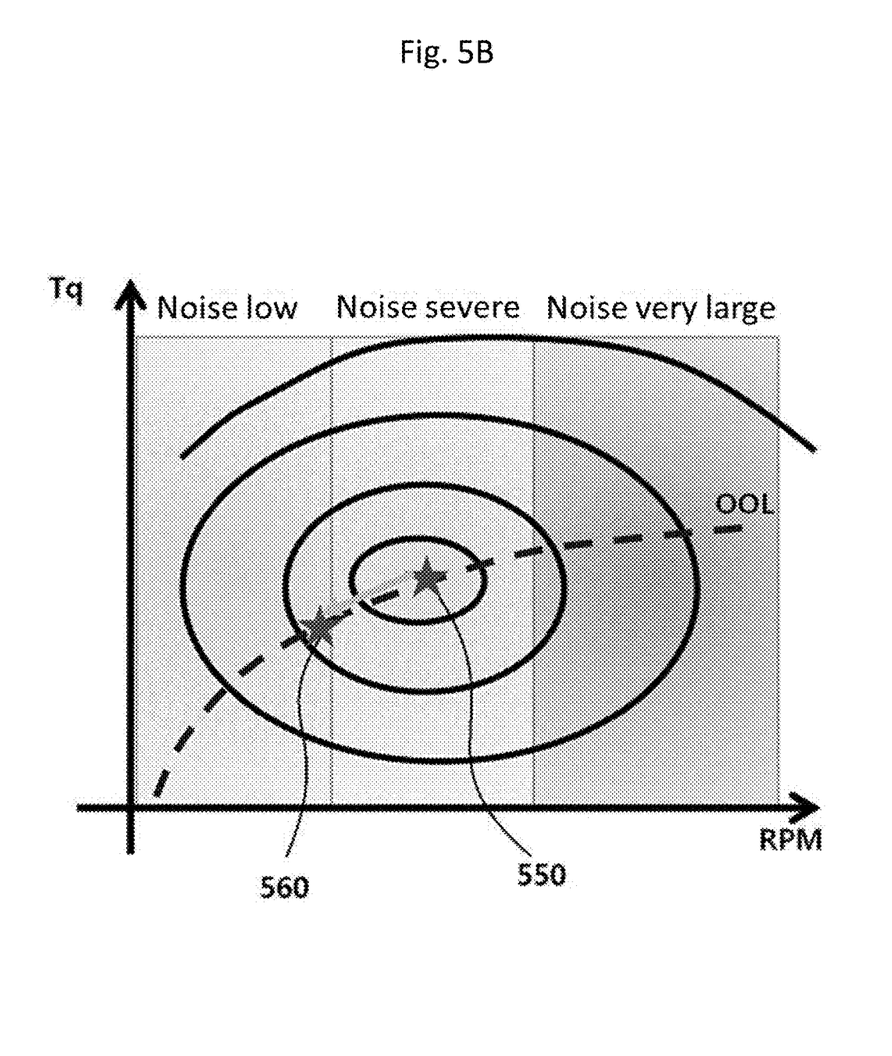

Next, the HEV operating point controlling unit 322 controls to reduce the overall noise of the powertrain by reducing the torque of the engine 110 and increasing the torque of the motor 140 by as much as the reduced amount of the engine torque through a control of load levelling and thus reducing the relatively large noise of the engine 110. This will be detailed with reference to FIG. 5.

FIGS. 5A and 5B represent an example of operating point control being performed in HEV mode according to an embodiment of the present disclosure.

In the upper graph of FIG. 5A, the horizontal axis indicates the RPM of the engine 110 and the vertical axis the torque of the engine 110, and in the lower graph, the horizontal axis the RPM of the motor 140 and the vertical axis the torque of the motor 140. Also, in the upper graph, the degree of the noise by engine operating point may be divided into 3 divisions of "very large," "severe," and "low," and in the lower graph, the degree of the noise by motor operating point may be divided into 3 divisions of "large," "middle," and "low" like FIG. 4. In addition, in each graph, the each curved loop (line) indicates an equal-power contour which connects the points of the same power values. This kind of noise map may be obtained according to the types of the engine and the motor and vehicles through tests.

In reference to FIG. 5A, since the current engine operating point 510 may be in the "very large" division, the HEV operating point controlling unit 322 may determine a change to an operating point 520 in the "severe" division at which the noise may be low compared to the current operating point 510. Accordingly, since the output torque of the engine 110 will be lowered, the HEV operating point controlling unit 322 may determine a new motor operating point 540 so that the torque of the current motor operating point 530 may be increased by as much as the reduced amount of the torque of the engine.

In other words, the HEV operating point controlling unit 322 may perform an operating point control for the engine 110 first to reduce the noise since the noise of the engine 110 may be greater than that of the motor 140, and then perform an motor operating point control to compensate for the variation of the torque due to the change of the engine operating point. Of course, the HEV operating point controlling unit 322, too, may restrict the amount of change per time unit of the output torque to maintain the vehicle in a stable driving state, taking it into consideration that, in case where a change of the engine or motor operating point may be accompanied by a variation of each output torque, the driver's concentration may be distracted due to recognition of audio output or voice command input.

On the other hand, according to other embodiments of this embodiment, a transmission control may be performed in the HEV mode, too, for the sake of efficiency. This will be detailed with reference to FIG. 5B.

In reference to FIG. 5B, a noise map of an engine, of which the RPM dependency may be great, may be shown. In here, the OOL (Optimal Operating Line) may be a line which connects the operating points at which the efficiency may be optimal with the same BSFC (brake-specific fuel consumption) range.

When determining to change to an operating point in the "low" division at which the noise may be low compared to the current operating point 550 since the current operating point 550 may be located in the "severe" division, the HEV operating point controlling unit 322 may determine to change to a new operating point 560 on the OOL. Due to the operating point being changed along the OOL, the engine efficiency may be kept optimal. Since the RPM of the engine may be reduced in this kind of situation, the HEV operating point controlling unit 322 may determine an upshift of the transmission gear to maintain the vehicle speed. At the same time, since the output torque of the engine will be reduced, the HEV operating point controlling unit 322 may determine a new motor operating point to increase the motor torque by as much as the reduced amount of the torque due to the lowered RPM.

The control terminating unit 323 may terminate the noise reduction control of the powertrain according to a notification of control termination from the determining unit 310. In here, terminating the noise reduction control may mean the powertrain following a default control with a driver's request torque (or request power), a battery state, a driving power source state, etc. taken into consideration, but it may not be necessarily limited thereto.

Figure 6:
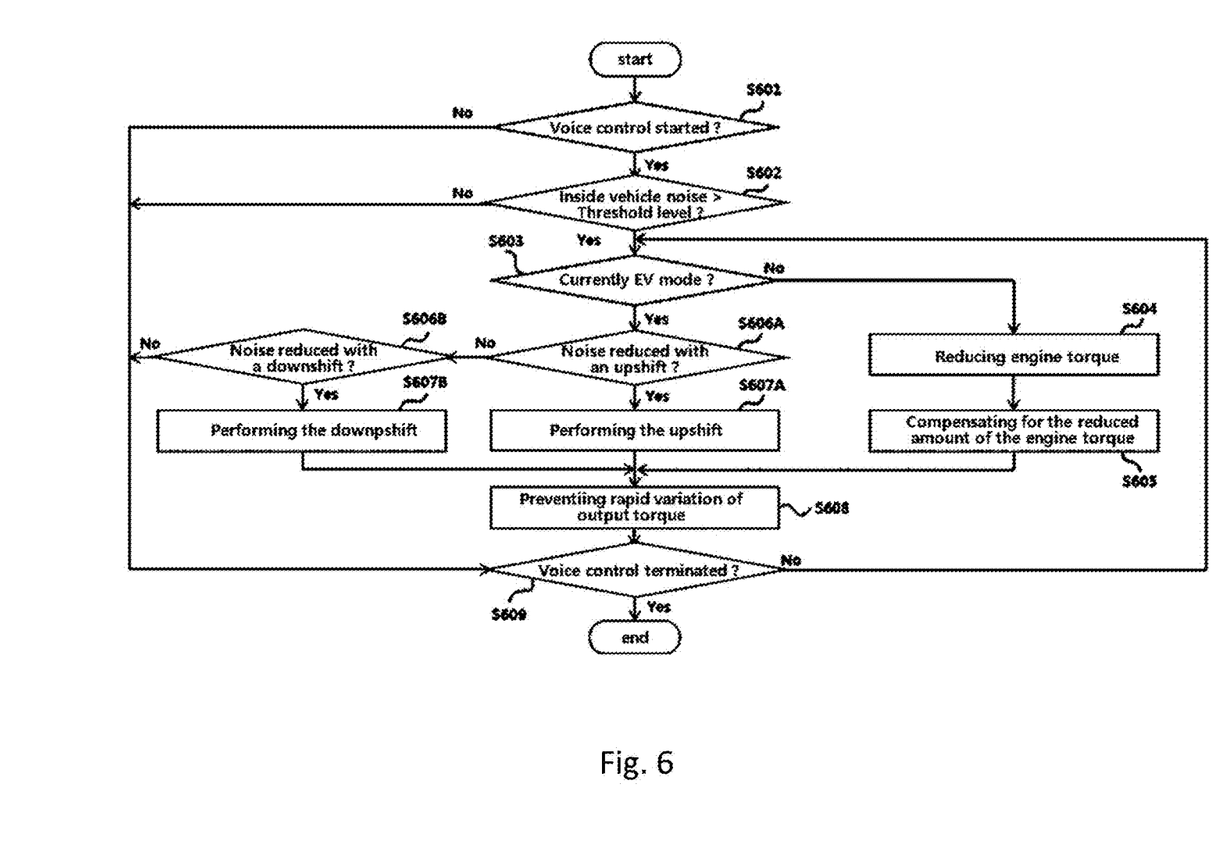
FIG. 6 is a flowchart representing an example of procedures for controlling a powertrain according to an embodiment of the present disclosure.

The above description for the noise reduction control of a powertrain may be summarized as the flowchart of FIG. 6.

FIG. 6 is a flowchart representing an example of procedures for controlling a powertrain according to an embodiment of the present disclosure.

In reference to FIG. 6, the determining unit 310 of the audio input/output supporting control unit 300 may judge whether voice control may be started (S601). Here, starting voice control may mean starting the audio guidance output or the voice command input described above in reference to FIG. 3.

Once the voice control started (Yes in S601), the determining unit 310 determines whether inside vehicle noise may be greater than a predetermined threshold noise level (S602), and, if yes (Yes in S602), determines an entry of control.

Accordingly, in case where the current drive mode may be HEV mode (No in S603), the determining unit 310 may request a HEV operating point control entry to the controlling unit 320, and the HEV operating point controlling unit 322 may perform a load levelling control for reducing the engine torque (S604) and compensating for the varied amount of the engine torque with a torque of the motor (S605).

If the current drive mode may be EV mode (Yes in S603), the determining unit 310 may request a EV operating point control entry to the controlling unit 320, and the EV operating point controlling unit 321 may determine, based on the current operating point and gear position, a gear position of the transmission at which the noise of the motor 140 may be reduced (S606A, S606B), and perform an upshift (S607A) or a downshift (S607B) according to the judged result. If the operating point may not be moved to an operating point at which the noise of the motor may be reduced with neither the upshift nor the downshift (i.e., No in S606A→No in S606B), the gear shift may not be performed. At the moment, it may be the same as described above that inhibiting mode transition to HEV mode may be requested.

In case where the gear shift (S607A or S607B) or the load levelling (S604 and S605) may be performed, the controlling unit 320 may restrict the variation rate of the output torque in order to prevent a rapid variation of the output torque (S608), and the step of S603 and the below steps may be repeated until the voice control terminated (S609).

The flowchart of FIG. 6 is written with respect to the control of FIG. 5A or the like, but in case of performing the control of FIG. 5B or the like, the step of S604 may be replaced with changing along the OOL line to an operating point at which the noise level may be lower than at the current operating point and, when the RPM being changed accordingly, performing a corresponding gear shift.

According to the above described embodiments of the present disclosure, performance of voice recognition and audio guidance may be improved through a modification of a logic of a hybrid control unit without adding hardware, and thus the merchandising power of a vehicle may be increased. In addition, it may be possible to transmit to a driver with better clarity the information while outputting important audio guidance.

On the other hand, the present disclosure described above may be embodied as computer-readable code on a medium in which a program may be recorded. The computer-readable medium includes all types of recording devices in which data readable by a computer system may be stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure may be included in the scope of the present disclosure.

What is claimed is:

1. A method of supporting audio input/output for a vehicle, the method comprising:
   determining whether a first condition for audio input/output function and a second condition for inside noise level are satisfied; and
   performing a noise reduction control by changing an operating point of a driving power source based on a current drive mode, in a case where the first and the second conditions are satisfied.

2. The method of claim 1, wherein the first condition comprises at least one of a start of audio guidance output and a start of voice command input.

3. The method of claim 2, wherein the performing of the noise reduction control comprises restricting a variation rate of an output torque of the driving power source.

4. The method of claim 1, wherein the second condition comprises whether the inside noise level is greater than a predetermined noise level.

5. The method of claim 1, wherein the performing of the noise reduction control, in a case where the current drive mode is an EV mode in which a motor is used as the driving power source, comprises performing a gear shift to a gear position corresponding to a new operating point at which noise of the motor is lower than at a current operating point.

6. The method of claim 5, wherein the performing of the noise reduction control comprises:
   determining a first operating point of the motor according to an upshift and a second operating point of the motor according to a downshift; and
   determining a gear position corresponding to one of the first operating point and the second operating point at which a motor noise is lower than at another of the second operating point and the first operating point.

7. The method of claim 6, wherein the determining of the gear position is performed with reference to a noise map for torque and RPM of the motor.

8. The method of claim 1, wherein, in a case where the current drive mode is an REV mode in which an engine and a motor are used as the driving power source, the performing of the noise reduction control comprises:
   changing a current operating point of the engine to a new operating point at which a noise level of the engine is lower; and
   compensating for a torque change of the engine according to the change of the new operating point of the engine by a change of an operating point of a motor.

9. The method of claim 8, wherein the changing of the current operating point of the engine to the new operating point is performed with reference to a noise map for torque and RPM of the engine.

10. A non-transitory computer readable recording medium with a program for executing the method of claim 1.

11. A vehicle comprising:
   a driving power source; and
   a control unit configured to determine whether a first condition for audio input/output function and a second condition for inside noise level are satisfied, and perform a noise reduction control by changing an operating point of a driving power source based on a current drive mode, in a case where the first and the second conditions are satisfied.

12. The vehicle of claim 11, wherein the first condition comprises at least one of a start of audio guidance output and a start of voice command input.

13. The vehicle of claim 11, wherein the second condition comprises whether the inside noise level is greater than a predetermined noise level.

14. The vehicle of claim 11, wherein the control unit, in a case where the current drive mode is an EV mode in which a motor is used as the driving power source, is configured to perform a gear shift to a gear position corresponding to a new operating point at which noise of the motor is lower than at a current operating point.

15. The vehicle of claim 14, wherein the control unit is configured to determine a first operating point of the motor according to an upshift and a second operating point of the motor according to a downshift, and determine a gear position corresponding to one of the first operating point and second operating point at which a motor noise is lower than at another of the second operating point and first operating point.

16. The vehicle of claim 15, wherein the control unit is configured to determine the gear position with reference to a noise map for torque and RPM of the motor.

17. The vehicle of claim 11, wherein, the control unit, in a case where the current drive mode is an REV mode in which an engine and a motor are used as the driving power source, is configured to change a current operating point of the engine to a new operating point at which a noise level of the engine is lower, and compensate for a torque change of the engine according to a change to the new operating point by a change of an operating point of a motor.

18. The vehicle of claim 17, wherein the control unit is configured to change the new operating point with reference to a noise map for torque and RPM of the engine.

19. The vehicle of claim 11, wherein the control unit is configured to restrict a variation rate of an output torque of the driving power source.

\* \* \* \* \*